(12) United States Patent
Bonet et al.

(10) Patent No.: US 6,564,242 B1
(45) Date of Patent: May 13, 2003

(54) DISTRIBUTED AUTOMATION SYSTEM

(75) Inventors: Jacques Bonet, Antibes (FR); Gilbert Brault, Vence (FR); Antonio Chauvet, Valbonne (FR); Jean-Marc Tixador, Villeneuve Loubet (FR)

(73) Assignee: Schneider Automation, Valbonne (FR)

( * ) Notice: Subject to any disclaimer, the term of this patent is extended or adjusted under 35 U.S.C. 154(b) by 0 days.

(21) Appl. No.: 09/414,347

(22) Filed: Oct. 7, 1999

(30) Foreign Application Priority Data

Oct. 8, 1998 (FR) .......................................... 98 12907

(51) Int. Cl.[7] .............................................. G06F 15/16
(52) U.S. Cl. ...................... 709/201; 709/203; 709/245; 712/32; 712/33; 710/100; 710/305
(58) Field of Search ................................ 709/245, 236, 709/303, 201–203, 217, 218, 220, 221, 101; 710/305, 100; 712/32, 33; 707/10, 100, 103

(56) References Cited

U.S. PATENT DOCUMENTS 4,949,299 A  8/1990  Pickett ....................... 364/900
5,805,442 A  9/1998  Crater et al. ................. 364/138
6,115,713 A  * 9/2000  Pascucci et al. ............... 707/10
6,151,625 A  * 11/2000  Swales et al. ............... 709/218

FOREIGN PATENT DOCUMENTS

DE   296 00 609 U1   3/1997
DE   196 15 190 A1   10/1997
EP   0 597 561 A1   5/1994
EP   0 825 506 A2   2/1998

* cited by examiner

Primary Examiner—Glenton B. Burgess
Assistant Examiner—Hien Le
(74) Attorney, Agent, or Firm—Oblon, Spivak, McClelland, Maier & Neustadt, P.C.

(57) ABSTRACT

A distributed automation system comprising a programmable logic controller connected to programmable logic controllers equipped with a host unit and couplers communicating with the host unit through the back panel bus. One of the couplers is connected through a bus to associated equipment, wherein the coupler can communicate with the associated equipment through a server function using the TCP/IP protocol. The server coupler is provided with a mass memory containing (1) "PLC variables" type software objects that manage access to PLC variables, and (2) "manufacturer" type software objects that transform information from PLC variable objects to manufacturer-type information that can be used by the associated equipment.

22 Claims, 3 Drawing Sheets

DISTRIBUTED AUTOMATION SYSTEM

BACKGROUND OF THE INVENTION

1. Field of the Invention

This invention relates to a distributed automation system comprising a programmable logic controller connected to programmable logic controllers and equipped with a host unit and couplers communicating with the said host unit through the back panel bus, one of the couplers being connected to associated equipment through a bus.

2. Discussion of the Background

Conventionally, an automation system is segmented at several levels. At the lower level, there is the sensors/ actuators bus that enables exchanges between programmable logic controllers or digital controls and sensors and actuators associated with them. At the upper level, there is a computer type bus connecting the computers carrying out supervision and the production site information system. At an intermediate level, there are the buses that form the junction between the previous levels. Therefore, this assembly is heterogeneous.

The use of the TCP/IP protocol and software adapted to this protocol to enable communication at different levels between equipment on an automation network, for example using an Ethernet type bus, is well known. Programmable logic controllers are then equipped with a TCP/IP module or coupler. This solution can federate several levels.

The Java language is considered for automation components at different levels, for example for supervision management and for production management. For example, refer to articles published in the May–June d1997 issue of CiMax, or in the May 1998 issue of Measures. The Java language has advantages related to portability and object orientation, and the possibility of executing programs written in Java called "applets" and imported through the network using a browser on a local station.

SUMMARY OF THE INVENTION

The purpose of this invention is to provide a hardware and software platform that makes a programmable logic controller active on an Intranet type network or its extensions by manipulation and/or production of manufacturer information, in other words "not involved" directly in real time instrumentation control and defining an object model adapted to the current structure of PLCs. It can be used to integrate industrial programmable logic controllers into a company information system without modifying the structure of PLCs. This satisfies the increasing need for integration of equipment forming part of the production facility and management systems (Supervisors, Automated production system, etc.).

The system according to the invention is characterized essentially by the fact that the coupler can communicate with associated equipment using the TCP/IP protocol using a server function, and it is provided with a mass memory containing firstly "PLC variable" type software objects that manage access to PLC variables, and secondly to "manufacturer" type software objects that transform information from PLC variable objects to manufacturer type information that be used by the associated equipment.

BRIEF DESCRIPTION OF THE DRAWINGS

The invention will now be described with reference to an embodiment given as an example and represented in the attached drawings, of which.

DESCRIPTION OF THE PREFERRED EMBODIMENTS

Figure 1:
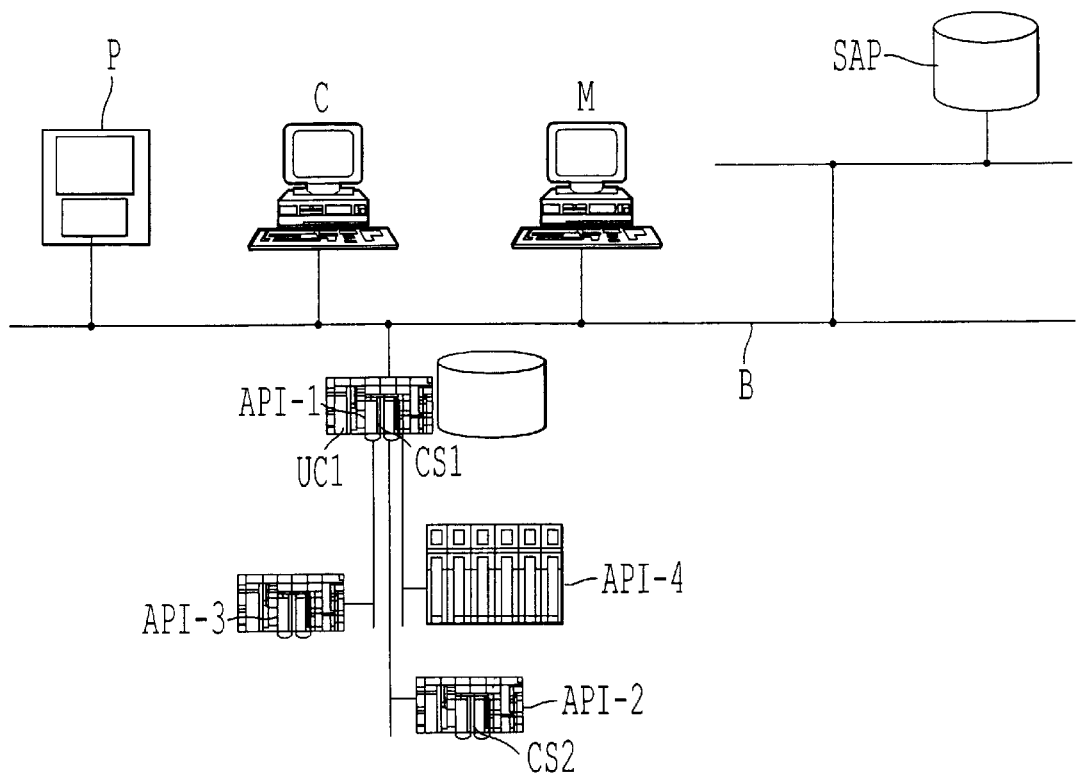
FIG. 1 is a diagram showing a distributed automation system.

The architecture shown in FIG. 1 comprises a PLC denoted API-1 equipped with a host unit UC1. This PLC communicates with other programmable logic controllers API-2, API-3, API-4 and with associated equipment SAP, M, C, P. PLC API-1 is equipped with a server coupler CS1 which will be describe below, and PLC API-2 is also equipped with a server coupler denoted CS2.

The host unit for each -programmable logic controller contains an application program, PAP, written in a standard automation language ("ladder", etc.) and manages inputs/ outputs using instrumentation control variables in real time, called PLC variables denoted VAR.

The server function coupler CS1 of the programmable logic controller API-1 communicates with the host unit UC1 of the PLC on which it is mounted, and with other couplers on this PLC, through the back panel bus. For example, PLC API-1 equipped with coupler CS1 can communicate with other programmable logic controllers denoted API-2, API-3, API-4, for example through a coupler. The server coupler CS1 is provided with a connector that it uses to communicate with associated equipment such as the SAP production management server, the dialog terminal P or computers C and M through a bus B using the TCP/IP protocol.

Figure 2:
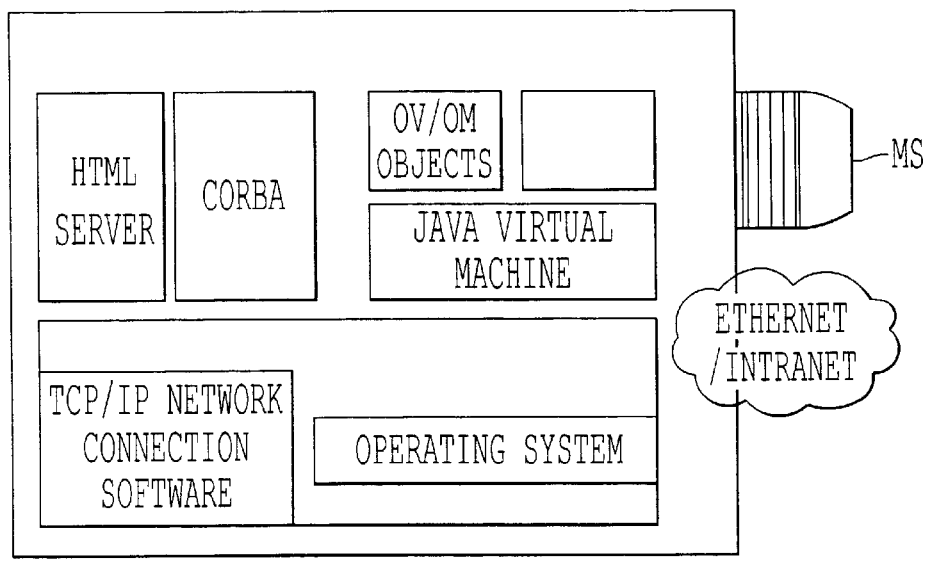
FIG. 2 is a diagram showing the software architecture of a server coupler used on a PLC according to the present invention.

With reference to FIG. 2, each server coupler CS1 or CS2 supports a JAVA real time operating system, a virtual machine that interprets the JAVA "byte-code" (intermediate code obtained after precompilation by a JAVA compiler). One of the functions of this operating system is to connect coupler CS1 to the TCP/IP type network. Each coupler CS1 or CS2 is provided with a mass memory MS and a microprocessor.

The coupler acting as a server CS1 on PLC API-1 has memory MS that contains firstly "PLC variables" software objects denoted OV that manage access to PLC variables VAR, and secondly "manufacturer" software objects denoted OM. This coupler CS1 supports a management server managing a set of HTLM type pages for "management" of the coupler, particularly to display the coupler status (On, Off, Error), to modify this status, to display the status of coupler OM and OV objects (On, Off, error) and to modify this status.

A manufacturer object OM can easily be "connected" to different types of OV objects, and therefore different types of protocols, which enables adaptation of coupler CS1 to all types of industrial protocols. An object OM1-S that is executed on coupler CS1 of PLC API-1 can use information produced by other objects OV-3 or OM-2 executed on a server coupler CS2 onboard in PLC API-2.

"PLC variable" objects OV can read or write values of one or several PLC variables VAR by using industrial control protocols. They transmit values of PLC variables to objects OM as a function of the type of the PLC variable and/or as a function of needs.

Figure 3:
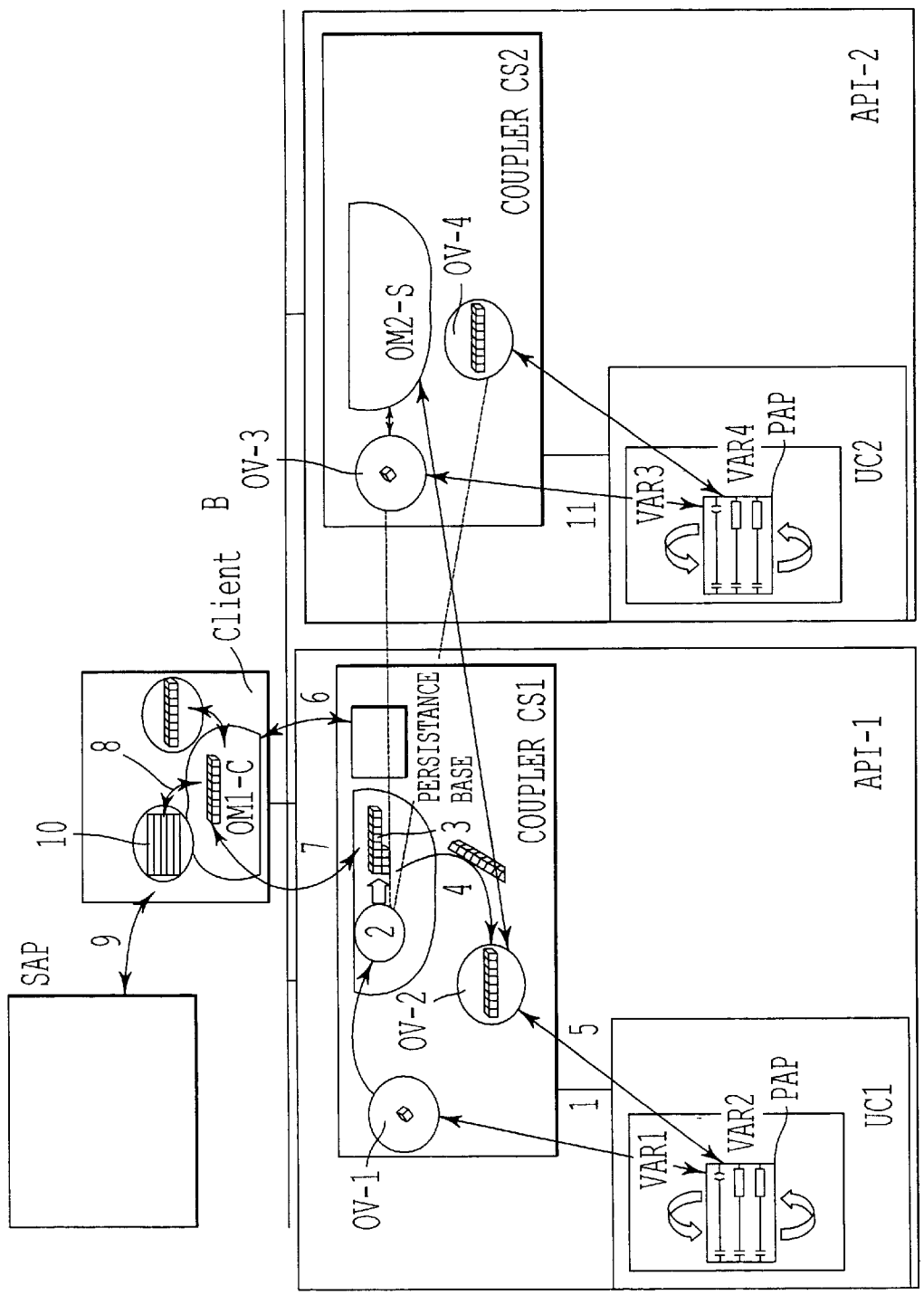
FIG. 3 illustrates information exchanges between different software objects in the distributed automation system.
Figure 5:
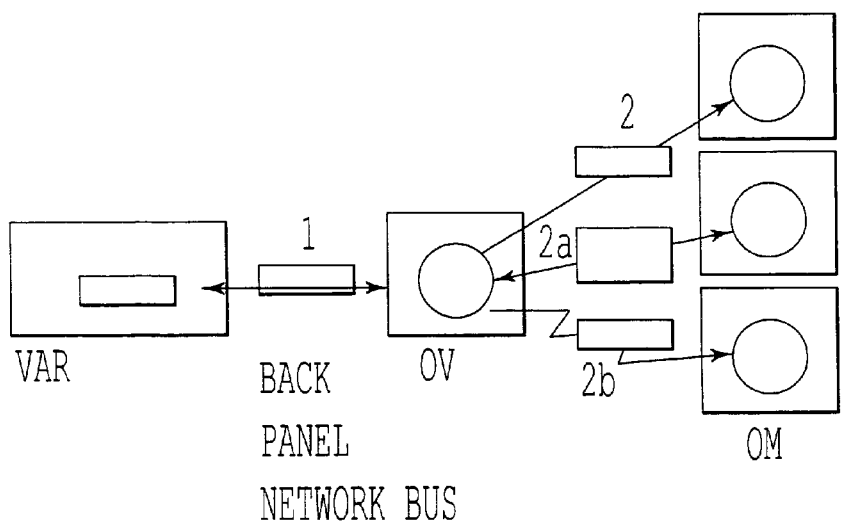
FIG. 5 illustrates exchanges between different software objects.

With reference to FIGS. 3 and 5, object OV-1 reads or writes the value of a PLC variable VAR1, using an operation denoted 1. The object OM1-S can read or write the said value in the same format as that manipulated by the PLC variable, using an operation denoted 2. It can also read or write the value by an operation 2a in FIG. 5, in a format different to the format of the PLC variable. In this case, although the value does not change, the format (or the dynamics) does change; for example, the value will be encoded on four bytes instead of being encoded on two bytes. The object OM1-S can also receive a relevant value in the form of an event.

Each object related to a PLC variable OV is assigned a unique symbolic name that is the name of the PLC variable manipulated by it. The symbolic name and associated address (also called the mark) are saved in a names server SN implemented in coupler CS1. The symbolic names and addresses are automatically updated, either if the name of a PLC variable is modified, or if the address of the PLC variable is modified.

Each "manufacturer" object is composed of an object such as OM1-S located on the server coupler CS1 and an object image OM1-C located on a client station such as P, C, M or SAP. It uses values of PLC variables supplied by an object OV or by an object OM to generate "manufacturer" type information, in other words information for example for use by the factory information system. This type of OM object can be exchanged between several industrial programmable logic controllers.

For example, manufacturer level information 3 may consist of an alarm generated by a production machine, industry specific data (for example the number of white cars or the number of bottles), a message sent by electronic mail, PLC/SAP server connection information, system diagnostic information, alarm management information, an alarm message as a function of values taken on by some PLC variables, or relational database management information, or event archiving management information on a relational data base, or information managing the display of a partial machine view.

A unique symbolic name is assigned to each "manufacturer" object OM and is stored in the names server SN and is adapted to operation on the network.

The client object OM1-C is the "proxy" or image of the server object OM1-S. The location of this image object OM1-C depends on its use. When the object OM1-C is not being used, it is stored in the persistence base BP of the server coupler CS1. When the object OM1-C is being used, it is executed on a client machine of the server coupler CS1, after unloading through the network from the persistence base BP. This persistence base BP contains the status of OV and OM objects (including the client object OM-C for OM objects).

By default, the client object OM1-C offers a "management" view of the OM object (status of the object, position, parameter). It can perform optional services depending on the nature of the OM object, for example such as the interface with external systems (SAP), a tabular alarm view for an alarm service, a mimic diagram, etc. The client object OM-C can be in the form of HTML pages, "applets", "Beans" (Java software components) or other software components.

Figure 4:
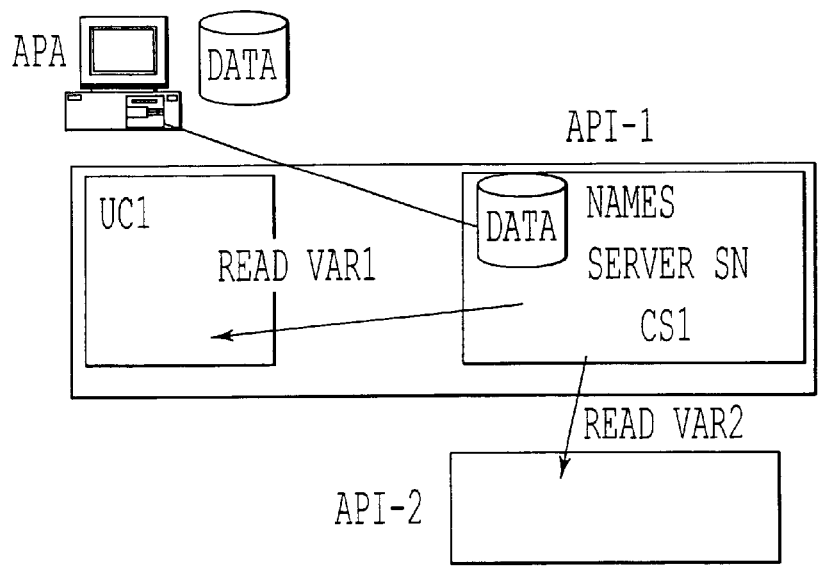
FIG. 4 illustrates how the server coupler names 5 server is updated if the PLC program is modified by a programming workshop.

Manufacturer objects OM output relevant data in the form of events (producer/consumer model) and ensure that the names of manipulated objects remain consistent. The server coupler CS1 maintains the names base, other software being connected to this server. For example, with reference to FIG. 4, a PLC programming workshop APA sends the list of modifications to the names server SN whenever a modification by the PLC program modifies a PLC variable related to an OV object.

The change to the configuration of the coupler CS1 hrough the network does not have any effect on the instrumentation control part of the PLC.

Its operation will now be explained:

With reference to FIG. 3, objects OV-1 and OV-2 receive information 1 and 5 about PLC variables from the host unit UC1. These objects OV-1 and OV-2 output information to the server part OM1-S of the manufacturer object. Furthermore, this object OM1-S can receive information about objects OV-3 and OV-4 from another PLC API-2. The server part MO1-S of the manufacturer object generates a manufacturer type information 3.

The server object OM1-S transmits manufacturer type information 3 to the client object OM1-C by an exchange denoted 7. The object OM1-S transmits synchronization information to host unit UC1.

A client station such as P, C, M or SAP transfers the client part of the object OM1-C through a browser or other means, by an exchange denoted 6. This client part of object OM1-C is stored on a client station either for a short moment (for example for a Web browser type connection), or permanently for example on a SAP server.

The software 10 for an external application executed on the client station will receive manufacturer type information through an exchange 8.

The SAP server is queried by the OM object or the SAP server sends data requested by the OM.

Obviously, it would be possible to imagine variations and improvements to detail, or even to envisage the use of equivalent means, without going outside the scope of the invention.

What is claimed is:

1. A distributed automation system, comprising:
   a first programmable logic controller (PLC) connected to a plurality of programmable logic controllers, the first programmable logic controller being equipped with a host unit, a server coupler, and a plurality of couplers, wherein
   the server coupler and the plurality of couplers are configured to communicate with said host unit through a back panel bus, the server coupler being connected through an external bus to a plurality of client stations,
   the server coupler is configured to communicate with the plurality of client stations through a server function using a TCP/IP protocol, and
   the server coupler is provided with a memory configured to store (1) PLC-variable-type software objects that manage access to PLC variables, and (2) manufacturer-type software objects that transform information from PLC variable objects to manufacturer-type information that can be used by the plurality of client stations.

2. The distributed automation system according to claim 1, wherein the server coupler supports a JAVA real-time operating system configured to enable a connection under TCP/IP.

3. The distributed automation system according to claim 1, wherein the server coupler supports an HTML server.

4. The distributed automation system according to claim 1, wherein the server coupler comprises a name server managing unique symbolic names assigned to each PLC-variable-type software object and to each manufacturer-type software object.

5. The distributed automation system according to claim 1, wherein each manufacturer-type software object is comprised of a server object located on the server coupler and a client object that is an image of the server object, the client object being located on the plurality of client stations.

6. The distributed automation system according to claim 1, further comprising a persistence base unit in the server coupler configured to store unused client objects and a status of objects related to PLC variables, server objects, and client objects.

7. The distributed automation system of claim 2, wherein the server coupler supports an HTML server.

8. The distributed automation system of claim 2, wherein the server coupler comprises a name server managing unique symbolic names assigned to each PLC-variable-type software object and to each manufacturer-type software object.

9. The distributed automation system of claim 2, wherein each manufacturer-type software object is comprised of (1) a server object located on the server coupler, and (2) a client object that is an image of the server object, the client object being located on the plurality of client stations.

10. The distributed automation system of claim 2, further comprising a persistence base in the server coupler configured to store unused client objects and a status of objects related to PLC variables, server objects, and client objects.

11. The distributed automation system of claim 7, wherein the server coupler comprises a name server managing unique symbolic names assigned to each PLC-variable-type software object and to each manufacturer-type software object.

12. The distributed automation system of claim 7, wherein each manufacturer-type software object is comprised of (1) a server object located on the server coupler, and (2) a client object that is an image of the server object, the client object being located on the plurality of client stations.

13. The distributed automation system of claim 7, further comprising a persistence base unit in the server coupler configured to store unused client objects and a status of objects related to PLC variables, server objects, and client objects.

14. The distributed automation system of claim 11, wherein each manufacturer-type software object is comprised of (1) a server object located on the server coupler, and (2) a client object that is an image of the server object, the client object being located on the plurality of client stations.

15. The distributed automation system of claim 14, further comprising a persistence base unit in the server coupler configured to store unused client objects and a status of objects related to PLC variables, server objects, and client objects.

16. The distributed automation system of claim 12, further comprising a persistence base unit in the server coupler configured to store unused client objects and a status of objects related to PLC variables, server objects, and client objects.

17. The distributed automation system of claim 3, wherein the server coupler comprises a name server managing unique symbolic names assigned to each PLC-variable-type software object and to each manufacturer-type software object.

18. The distributed automation system of claim 3, wherein each manufacturer object is comprised of (1) a server object located on the server coupler, and (2) a client object that is an image of the server object, the client object being located on the plurality of client stations.

19. The distributed automation system of claim 3, further comprising a persistence base unit in the server coupler configured to store unused client objects and a status of objects related to PLC variables, server objects, and client objects.

20. The distributed automation system of claim 4, wherein each manufacturer object is comprised of (1) a server object located on the server coupler, and (2) a client object that is an image of the server object, the client object being located on the plurality of client stations.

21. The distributed automation system of claim 4, further comprising a persistence base unit in the server coupler configured to store unused client objects and a status of objects related to PLC variables, server objects, and client objects.

22. The distributed automation system of claim 5, further comprising a persistence base unit in the server coupler configured to store unused client objects and a status of objects related to PLC variables, server objects, and client objects.

* * * * *